United States Patent
Rifqi et al.

[11] Patent Number: 5,780,371
[45] Date of Patent: Jul. 14, 1998

[54] REINFORCED GLASS SUBSTRATE

[75] Inventors: Francoise Rifqi, Paris; Stephanie Koch, Asnieres; Didier Jousse, St Leu La Foret, all of France

[73] Assignee: Saint-Gobain Vitrage S.A., Courbevoie, France

[21] Appl. No.: 652,590

[22] PCT Filed: Oct. 5, 1995

[86] PCT No.: PCT/FR95/01296

§ 371 Date: Aug. 19, 1996

§ 102(e) Date: Aug. 19, 1996

[87] PCT Pub. No.: WO96/11888

PCT Pub. Date: Apr. 25, 1996

[30] Foreign Application Priority Data

Oct. 13, 1994 [FR] France ............. 94 12209
Nov. 30, 1994 [FR] France ............. 94 14352

[51] Int. Cl.$^6$ ............. C03C 3/093; C03C 15/02; C03C 21/00
[52] U.S. Cl. ............. 501/67; 501/69; 501/70; 65/30.13; 65/30.14; 428/65.3; 428/694 ST; 428/694 SG
[58] Field of Search ............. 501/67, 70; 65/30.13, 65/30.14; 428/64.2, 65.3, 65.6, 694 ST, 694 SG

[56] References Cited

U.S. PATENT DOCUMENTS

| | | | |
|---|---|---|---|
| 3,772,135 | 11/1973 | Hara et al. | 65/30.14 |
| 4,015,045 | 3/1977 | Rinehart | 65/30.14 |
| 4,119,760 | 10/1978 | Rinehart | 65/30.14 |
| 4,671,814 | 6/1987 | Aratani et al. | 65/30.14 |
| 4,803,106 | 2/1989 | Lenhart et al. | 428/64 |
| 4,859,636 | 8/1989 | Aratani et al. | 501/72 |
| 4,994,415 | 2/1991 | Imai et al. | 501/66 |
| 5,508,237 | 4/1996 | Moffatt et al. | 501/69 |
| 5,561,089 | 10/1996 | Ishizaki et al. | 501/10 |
| 5,599,754 | 2/1997 | Maeda et al. | 501/70 |
| 5,691,256 | 11/1997 | Taguchi et al. | 501/63 |

FOREIGN PATENT DOCUMENTS 3-40933 3/1991 Japan.

*Primary Examiner*—Karl Group
*Assistant Examiner*—Louis M. Troilo
*Attorney, Agent, or Firm*—Oblon, Spivak, McClelland, Maier & Neustadt, P.C.

[57] ABSTRACT

The invention relates to glass substrates intended for use as a support in data storage units, reinforced by surface ion exchanges and whose matrix comprises the constituents given hereinafter in the following weight proportions:

| | |
|---|---|
| $SiO_2$ | 45–65% |
| $Al_2O_3$ | 0–20% |
| $B_2O_3$ | 0–5% |
| $Na_2O$ | 4–12% |
| $K_2O$ | 3.5–12% |
| MgO | 0–8% |
| CaO | 0–13% |
| $ZrO_2$ | 0–20% | the sum of the oxides $SiO_2$, $Al_2O_3$ and $ZrO_2$ remaining equal to or below 70%, said composition optionally incorporating the oxides BaO and/or SrO in proportions $11\% \leq MgO+CaO+BaO+SrO \leq 24\%$ and the alkaline oxides are introduced in the following weight percentages $0.22\% \leq Na_2O/Na_2O+K_2O \leq 0.60$.

19 Claims, No Drawings

REINFORCED GLASS SUBSTRATE

The invention relates to glass substrates more particularly used as supports in the production of data storage units. The invention more particularly relates to glass substrates in the form of disks more particularly used as "peripheral" memories in the data processing field. Although the invention is not restricted to this application, it will be described with reference to the production of hard magnetic disks.

A hard magnetic disk is generally constituted by a support element worked in such a way that it is shaped like a centrally perforated disk. On said disk can in particular be deposited a series of thin magnetic films used for the storage of data.

The data are recorded and read with the aid of one or more reading heads, which are placed above the disk, whilst the latter performs a rotary movement. In order to obtain high performance data reading, the reading head must be as close as possible to the disk and the term contact recording is used. Thus, the signal detected by the head decreases exponentially when its altitude increases. Moreover, modern requirements require an ever larger storage density, so that a given information is stored on an ever smaller surface. In order to ensure the reading of data recorded in this way, the distance separating the disk from the reading head must be very small and namely below 300 Angstroms.

Substrates for producing hard magnetic disks are in particular described in U.S. Pat. No. 5,316,844, where the substrates are of aluminium. This document also describes an important aspect of such substrates, namely they must only have a very limited roughness. This document indicates roughness values, whereof the Ra or average roughness is between 100 and 300 Angstroms. Modern requirements, linked for an increasing storage need and therefore an ever smaller distance between the disk and reading head, correspond to a Ra below 30 Angstroms.

Although the requirements concerning the storage capacity of hard magnetic disks become increasingly severe, another requirement, which may appear paradoxical, relates to the dimensions of said disks. Thus, said data storage units must have a minimum overall size and also a reduced weight.

These requirements are linked on the one hand for the increasing need of portable and therefore small and light storage units. The development of portable data processing tools and software requiring large storage capacities form the basis for this requirement. For increasing the data storage capacity, it is also advantageous to be able to combine several hard magnetic disks in a given space and therefore to have substrates with a reduced thickness.

An aluminium substrate cannot have a thickness below 0.6 mm and at the same time the qualities required for forming a hard disk, namely rigidity and resistance to damage when the reading head strikes against the disk.

To obviate these disadvantages and lighten and possibly reduce the thickness of such a substrate, it is proposed in European patent application 579 399 to produce the same from glass. Thus, conventional glass compositions have been used making it possible to obtain a float glass of the building or car type. The float glass is obtained in the form of a ribbon, is then transformed into a sheet and finally cut and worked into disks having the requisite dimensions. The disks are then polished to obtain the desired thickness and roughness.

It has been found during tests that these glass substrates are subject to different disadvantages and consequently are not satisfactory for the production of hard magnetic disks. In particular, the surface of such float glass substrates is subject to a significant loss of alkalis and in particular potassium or sodium and essentially the ion supplied by chemical tampering. These alkalis have prejudicial effects on the magnetic films deposited on the substrates. Thus, it would appear that the salting out of the alkalis into these films causes the destruction of the recorded data over a more or less short term.

The object of the invention is to obviate these disadvantages and more particularly form substrates used as supports in the production of data storage units, such as hard magnetic disks, which permit the storage of large information quantities and which have limited overall dimensions and weight.

The invention is also directed at substrates having satisfactory chemical and mechanical strength characteristics and which do not suffer from the disadvantages observed in connection with the aforementioned float glass substrates.

This object is achieved according to the invention by a glass substrate intended for use as a support in data storage units, reinforced by surface ion exchanges and whose matrix comprises the constituents given hereinafter in the following weight proportions:

| | |
|---|---|
| $SiO_2$ | 45–65% |
| $Al_2O_3$ | 0–20% |
| $B_2O_3$ | 0–5% |
| $Na_2O$ | 4–12% |
| $K_2O$ | 3.5–12% |
| $MgO$ | 0–8% |
| $CaO$ | 0–13% |
| $ZrO_2$ | 0–20% | the sum of the oxides $SiO_2$, $Al_2O_3$ and $ZrO_2$ remaining equal to or below 70%, said composition optionally incorporating the oxides BaO and/or SrO in proportions $11\% \leq MgO+CaO+BaO+SrO \leq 24\%$ and the alkaline oxides are introduced in the following weight percentages $0.22 \leq Na_2O/Na_2O+K_2O \leq 0.60$.

The glassmaking matrixes of the substrates according to the invention advantageously comprise the oxide ZnO in a weight proportion below 10% and preferably below 4%. This oxide is able to improve the hydrolytic resistance, without increasing the viscosity at high temperatures.

A substrate produced from one of the compositions listed hereinbefore and which has undergone an ion exchange, particularly by a chemical tempering treatment, can be used as a support for producing a data storage unit and more particularly a hard magnetic disk. Thus, the mechanical resistance and the chemical or hydrolytic resistance obtained are suitable for such uses.

Moreover, as has been stated hereinbefore, there are also roughness constraints linked with the very high rotation speeds and the relatively close positioning of the reading head, the requirements being an Ra below 30 Angstroms.

However, it is possible on the basis of procedures known in the glass industry to transform a glass sheet obtained by the float process into a substrate satisfying the different tolerances. These procedures essentially consist of cutting, drilling and working stages performed on the edges (or edging). These are followed by conventional polishing stages using mechanical means, so as to be able to obtain on the one hand the desired thickness and on the other a roughness with a Ra below 30 Angstroms. It is also possible to bring about a finishing polishing, so as to give a roughness with a Ra below 10 Angstroms. Such a polishing can optionally combine several mechanical and/or chemical polishing stages.

In a variant of the invention, substrates are produced by a pressing or moulding method, a parison being brought into a mould or press giving it the desired shape. It is then possible to carry out the different polishing stages.

The invention also provides for other methods for producing these substrates. A non-limitative list of shaping processes which can be used is given hereinafter: rolling, downward stretching or drawing and cutting up washers.

In a variant of the invention, the glass substrates has a matrix comprising the following constituents in the weight proportions given hereinafter:

| | |
|---|---|
| $SiO_2$ | 45–65% |
| $Al_2O_3$ | 5–20% |
| $B_2O_3$ | 0–5% |
| $Na_2O$ | 4–12% |
| $K_2O$ | 4–12% |
| MgO | 0–8% |
| CaO | 0–8% |
| $ZrO_2$ | 0–6% |

According to a preferred form of this variant, the oxide $Al_2O_3$, which is advantageous for the chemical resistance, has an overall content above 10%. It also makes it possible to increase the strain point temperature, which is an interesting factor, particularly for performing chemical tempering at high temperatures.

The content of $ZrO_2$, which is a difficultly meltable element, is advantageously below 5%.

The oxide $B_2O_3$ is only involved to a limited extent in the mechanical and chemical properties of the glassmaking matrix. It also has the advantage of reducing the viscosity at elevated temperatures. The $B_2O_3$ content is advantageously between 0 and 3% and preferably below 2% in order to favour the homogeneity of the glass.

Preference is given to a glass composition chosen from among the following:

| | |
|---|---|
| $SiO_2$ | 45–60% |
| $Al_2O_3$ | 10–20% |
| $B_2O_3$ | 0–3% |
| $Na_2O$ | 4–12% |
| $K_2O$ | 4–12% |
| MgO | 0–8% |
| CaO | 0–8% |
| $ZrO_2$ | 0–5% | the sum of the oxides $SiO_2$, $Al_2O_3$ and $ZrO_2$ remaining equal to or below 70%, said composition optionally incorporating the oxides BaO and/or SrO in proportions 14%≦MgO+CaO+BaO+SrO≦22% and the alkaline oxides are introduced in the following weight percentages: 0.22≦$Na_2O$/$Na_2O$+$K_2O$≦0.60.

The overall content of alkaline earth elements is maintained sufficiently high so that a low viscosity is obtained at a high temperature. This is more particularly of interest when the glass is obtained by the float process.

The presence of these elements also aid the melting of these glass compositions. BaO contributes to the reduction of the viscosity at high temperatures. It also reduces devitrification risks. MgO and SrO increase the hydrolytic resistance of glasses.

The contents of the alkaline oxides $Na_2O$ and $K_2O$ are from the molar standpoint advantageously close together. Thus, there is then a mixed alkali phenomenon, which limits the surface migration of alkalis. The migration of ions is greatly decreased when $Na_2O$ and $K_2O$ are present in roughly equivalent molar quantities. The surface state obtained after ion exchange, i.e. for example an absence of sodium ions over a limited thickness, can last for a long time due to the mixed alkali effect, which limits the migration of ions.

According to another variant of the invention, the glass substrate has a matrix belonging to another family, containing the following constituents in the following weight proportions:

| | |
|---|---|
| $SiO_2$ | 45–63% |
| $Al_2O_3$ | 0–18% |
| $Na_2O$ | 4–12% |
| $K_2O$ | 3.5–7% |
| MgO | 1–8% |
| CaO | 1–13% |
| $ZrO_2$ | 6.5–20% |

For this glass family, $ZrO_2$ serves as a stabilizer. To a certain extent this oxide increases the chemical resistance of the glass and aids the increase in its annealing temperature. The $ZrO_2$ percentage must not exceed 20%, otherwise melting would become too difficult. Although this oxide is difficult to melt, it offers the advantage of not increasing the viscosity of the glasses according to the invention at high temperatures. This avoids the introduction into said glasses of oxides such as $B_2O_3$, one of whose effects is to reduce the viscosity of the glass, or increase the content of alkaline oxides, which have the same effect.

The glasses according to this variant of the invention can also contain alumina, which serves a similar function to that of zirconium oxide. The alumina increases the chemical resistance of this type of glass and aids the raising of its strain point. However, it is a difficultly meltable oxide and its increases the viscosity of the glass at high temperatures.

In an overall manner, the melting of the glasses according to this variant of the invention remains within acceptable temperature limits for a production according to the float process, provided that the sum of the oxides $SiO_2$, $ZrO_2$ and $Al_2O_3$ remains equal to or below 70%. The term acceptable limits is understood to mean that the temperature of the glass corresponding to log η=1.6 does not exceed approximately 1630° C. and preferably 1590° C.

In the glasses according to the invention, the sum of the oxides $ZrO_2$ and $Al_2O_3$ is advantageously equal to or above 8% and is preferably between 8 and 22%. Their $ZrO_2$ content is advantageously between 8 and 15%.

The preferred glass compositions according to this variant of the invention incorporate the following constituents in the weight proportions given hereinafter:

| | |
|---|---|
| $SiO_2$ | 45–59% |
| $Al_2O_3$ | 0–10% |
| $Na_2O$ | 4–10% |
| $K_2O$ | 3.5–7% |
| MgO | 1–7% |
| CaO | 1–12% |
| $ZrO_2$ | 8–15% |

According to a preferred variant of the invention, the surface ion exchanges are obtained in a $KNO_3$ bath permitting an exchange of sodium ions in potassium ions.

In a variant, use is made of a mixed bath, i.e. a bath containing several types of alkaline ions, which permits a multiple ion exchange.

In other variants, the chemical tempering can be activated by external factors such as the creation of an electric field or the presence of ultrasonics. The chemical tempering can also be combined with a thermal pretreatment.

From the economic standpoint, it is necessary to perform the chemical tempering as rapidly as possible. This tempering time is preferably below 15 hours and even more preferably below 7 hours. The tempering temperature is advantageously between 400° and 520° C. A tempering performed under such conditions leads to a rupture modulus in annular bending above 500 MPa and a tempering depth of at least 14 microns.

Tempering performed in this way has a double function. It firstly reinforces the chemical resistance of the substrate, the hydrolytic attackability of the tempered substrate decreasing. Secondly tempering permits a mechanical reinforcement of the surface. It brings about a surface reinforcement of the intrinsic properties of the substrate linked with its composition. This is of great interest and makes it possible to obtain a satisfactory mechanical strength, particularly a resistance to bending, shocks and crushing, e.g. due to the reading head.

The inventors have also revealed the reasons for the breaking of hard magnetic disks performing a high speed rotary movement. During the drilling and working, particularly of the internal hole, many defects appear in areas which are difficult to work. Therefore chemical tempering reinforces the worked edges of the substrate.

A substrate according to the invention satisfies the necessary criteria to permit its use as a support in the production of a hard magnetic disk. As a result of the combination of the composition and the chemical tempering, optionally associated with another prior treatment, this leads to an adequate mechanical resistance or strength, on the one hand on the surface in order to withstand the crushing of the reading head, and on the other on the edges, particularly the inner edge, which can withstand the high rotation speeds. It also has an adequate chemical resistance and in particular a hydrolytic resistance ensuring a perenniality of a hard magnetic disk.

Other details and features of the invention can be gathered from the following description of exemplified substrates according to the invention and tests performed. The substrates produced are disks with an external diameter of 65 mm, an internal diameter of 20 mm and a thickness of 0.635 mm.

The chosen composition A, B and C for producing the substrates are given below as percentages by weight:

|  | A | B | C |
| --- | --- | --- | --- |
| $SiO_2$ | 53.6% | 48.5% | 54.6% |
| $Al_2O_3$ | 10.0% | 14.8% | 3.0% |
| $B_2O_3$ | 2.2% | 0% | 0% |
| $Na_2O$ | 5.2% | 5.3% | 6.0% |
| $K_2O$ | 6.2% | 6.5% | 6.9% |
| MgO | 4.2% | 3.8% | 4.2% |
| CaO | 6.8% | 6.6% | 3.5% |
| SrO | 7.0% | 7.0% | 8.0% |
| BaO | 2.8% | 5.5% | 3.8% |
| $ZrO_2$ | 2.0% | 2.0% | 10.0% |

The compositions are melted and transformed into glass ribbons according to the float process and then into glass sheets. Thus, the substrates are obtained by cutting, working and then polishing. Polishing is performed by conventional mechanical means, so as to give a roughness with a Ra below 10 Angstroms. This is followed by chemical tempering in a potassium nitrate ($KNO_3$) bath.

It is interesting to note that the compositions have high strain point temperatures of approximately 580° C., so that tempering can take place at a relatively high temperature. The chemical tempering is more effective on approaching a temperature close to the strain point. A higher temperature during tempering makes it possible to obtain the latter more rapidly, whilst retaining a high surface stress and/or a high ion exchange depth.

Other remarkable values of these compositions are also of interest. Thus, these compositions are chosen for shaping according to the float process and must consequently satisfy the requirements associated therewith. It is in particular a question of temperature corresponding to the viscosities required during the melting log $\eta=1.6$ and during the entry on the tin bath log $\eta=3.5$. The corresponding temperatures of the chosen composition are given below:

|  | A | B | C |
| --- | --- | --- | --- |
| T(log$\eta$ = 1.6) | 1556° C. | 1587° C. | 1559° C. |
| T(log$\eta$ = 3.5) | 1137° C. | 1183° C. | 1181° C. |

These temperatures are compatible with the float process.

The liquidus temperatures of the compositions are:

A: TLiq=1120° C.

B: TLiq=1180° C.

C: TLiq=1170° C.

As these temperatures are below T(log $\eta=3.5$), the glasses can be obtained by the float process without any devitrification risk.

Different tests making it possible to characterize the mechanical strength and also the chemical resistance, were performed on the substrates as described hereinbefore.

The first test performed relates to the thermal shock resistance. This test demonstrated that the substrates produced according to the invention are appropriate for the treatments which they must subsequently undergo, e.g. during the deposition of magnetic films. During test, the substrates resisted without damage temperature variations from 350° to 20° C.

Another test, already mentioned hereinbefore, consists of rotating a substrate at a high speed (7000 to 25000 r.p.m.). The substrates according to the invention satisfied this test. The reinforcement, particularly of the edges, obtained after chemical tempering is consequently satisfactory.

The final mechanical test performed consists of an annular bending. The testing device is constituted on the one hand by a diameter 55 mm hollow cylinder, on which is deposited concentrically the substrate and on the other a diameter 30 mm hollow cylinder, which is supported in bending on the substrate. The latter cylinder is also concentric with respect to the other elements.

This test was performed on the substrates according to the invention which had undergone chemical tempering processes of different durations. It was also performed on an untempered substrate.

The results of these tests are compared with that obtained on a substrate which had undergone a chemical tempering and whose composition is of the soda-lime-silica type conventionally used for the float process. This substrate has an excessive alkali salting out level for satisfying the requirements for use as a support in a hard magnetic disk. Its modulus of rupture in annular bending or its surface strain or stress are considered satisfactory, so that the modulus of rupture can serve as a reference. The present requirements for this type of substrate are an average modulus of rupture above 240 MPa with a minimum value exceeding 150 MPa.

The results obtained are give below:

| Nature of substrate | Chemical tempering duration and temperature | Modulus of rupture MPa |
|---|---|---|
| Composition A | No tempering | 117 |
| Composition A | 4 h, 500° C. | 396 |
| Composition A | 7 h, 500° C. | 601 |
| Composition B | 4 h, 500° C. | 380 |
| Composition B | 7 h, 500° C. | 571 |
| Composition C | 4 h, 500° C. | 390 |
| Composition C | 7 h, 500° C. | 560 |

The results of the above table demonstrate that a tempering treatment which can be for a duration less than 4 hours is satisfactory for brining about the desired mechanical strength.

In addition, the depth of the defects of a substrate according to the invention, which had not undergone a chemical tempering treatment was estimated. This measurement revealed a maximum depth of 15 microns. Therefore the exchange depth during tempering must exceed this value. Measurements of exchange depths were made for composition A. The measurements were performed with an electronic microprobe. It would appear that as from 4 hours of treatment, the value of 15 microns is exceeded.

|  | Chemical tempering duration and temperature | Exchange depth (microns) |
|---|---|---|
| Composition A | 4 h, 500° C. | 23 |
| Composition B | 7 h, 500° C. | 31 |

Other tests concerning the hydrolytic resistance of substrates according to the invention were performed.

The first hydrolytic resistance measurement was performed on substrates according to the invention which had not undergone a chemical tempering. This measurement is compared with that performed on a substrate having a glass composition of the float type. These measurements were performed by the D.G.G. method.

This method consists of immersing 10 g of crushed glass, whose grain size is between 360 and 400 micrometers, in 100 milliliters of water raised to boiling for 5 hours. Following rapid cooling, the solution is filtered and a given volume of the filtrate is evaporated to dryness. The weight of the dry matter obtained makes it possible to calculate the glass quantity dissolved in the water. This quantity is expressed in milligrams per gram of tested glass.

| Results: | |
|---|---|
| Substrate A | 7 mg/g |
| Substrate B | 6 mg/g |
| Substrate C | 11 mg/g |
| Float-type substrate | 30 mg/g |

These results show that the substrates according to the invention have a hydrolytic resistance well above that of a substrate produced from a conventional composition for a use according to the float process. Thus, the value measured according to said method on a substrate according to the invention virtually corresponds to that which would be obtained for an alkali-free glass composition. Therefore the glass composition according to the invention is of great interest from a chemical resistance standpoint.

Another method making it possible to evaluate the hydrolytic resistance of a substrate according to the invention, which has optionally undergone a chemical tempering treatment, consists of an ageing of the substrate in a sealed enclosure for one week at a temperature of 80° C. and in an atmosphere with a relative humidity of 80%.

The substrate is then observed by scanning electron microscopy and surface crystallizations are analyzed by EDX (Energy Dispersion X-ray).

This test does not make it possible to quantify the salting out level of the alkalis. However, it makes it possible to compare the different substrates. It is therefore possible to ensure the perenniality of a substrate e.g. on the basis of a reference substrate.

A final method for evaluating the hydrolytic resistance of a substrate which has undergone a chemical tempering consists of immersing for several hours (approximately 24 hours) in demineralized water at 80° C., followed by plasma torch dosing of ions which have passed into solution and more particularly alkalis ($K^+$, $Na^+$, $Li^+$). This quantitative test is well correlated with the previously described test.

These tests were performed on substrates according to the invention. The results obtained are satisfactory and show that the hydrolytic resistance of the substrates, after chemical tempering, is satisfactory for the envisaged applications.

The results of the different tests reveal the mechanical resistance and hydrolytic resistance of a substrate produced according to the invention. They therefore confirm the possibility of using substrates according to the invention as a support in a data storage unit such as a hard magnetic disk.

We claim:

1. A glass substrate, obtained by (1) forming a base glass having a composition comprising the following constituents in the weight percentages given below:

| $SiO_2$ | 45–65% |
|---|---|
| $Al_2O_3$ | 0–20% |
| $B_2O_3$ | 0–5% |
| $Na_2O$ | 4–12% |
| $K_2O$ | 3.5–12% |
| MgO | 0–8% |
| CaO | 0–13% |
| $ZrO_2$ | 0–20% | wherein the sum of $SiO_2$, $Al_2O_3$ and $ZrO_2$ is less than or equal to 70% by weight, wherein $0.22 \leq Na_2O/(Na_2O+K_2O) \leq 0.60$, wherein BaO, SrO, or a mixture thereof are optionally present, and wherein 11 % wt. % $\leq$ MgO+CaO+BaO+SrO $\leq$ 24 wt. %, (2) polishing said base glass to form a polished base glass, and (3) reinforcing said polished base glass by a surface ion exchange.

2. The glass substrate of claim 1, wherein the base glass is a composition comprising the following constituents in the weight percentages given below:

| $SiO_2$ | 45–65% |
|---|---|
| $Al_2O_3$ | 0–20% |
| $B_2O_3$ | 0–5% |
| $Na_2O$ | 4–12% |
| $K_2O$ | 4–12% |
| MgO | 0–8% |
| CaO | 0–8% |
| $ZrO_2$ | 0–6%. |

3. The glass substrate of claim 1, comprising $Al_2O_3$ in an amount greater than or equal to 10 wt. %.

4. The glass substrate of claim 1, comprising $ZrO_2$ in an amount less than 5 wt. %.

5. The glass substrate of claim 1, comprising CaO in an amount less than 3 wt. %.

6. The glass substrate of claim 1, comprising $B_2O_3$ in an amount less than 3 wt. %.

7. The glass substrate of claim 1, wherein the base glass is a composition comprising the following constituents in the weight percentages given below:

|  |  |
|---|---|
| $SiO_2$ | 45–60% |
| $Al_2O_3$ | 10–20% |
| $B_2O_3$ | 0–3% |
| $Na_2O$ | 4–12% |
| $K_2O$ | 4–12% |
| MgO | 0–8% |
| CaO | 0–8% |
| $ZrO_2$ | 0–5%. |

8. The glass substrate of claim 7, wherein 14 wt. %≦MgO+CaO+BaO+SrO≦22 wt. %.

9. The glass substrate of claim 1, wherein the base glass is a composition comprising the following constituents in the weight percentages given below:

|  |  |
|---|---|
| $SiO_2$ | 53.6% |
| $Al_2O_3$ | 10.0% |
| $B_2O_3$ | 2.2% |
| $Na_2O$ | 5.2% |
| $K_2O$ | 6.2% |
| MgO | 4.2% |
| CaO | 6.8% |
| SrO | 7.0% |
| BaO | 2.8% |
| $ZrO_2$ | 2.0%. |

10. The glass substrate of claim 1, wherein the base glass is a composition comprising the following constituents in the weight percentages given below:

|  |  |
|---|---|
| $SiO_2$ | 45–63% |
| $ZrO_2$ | 6.5–20% |
| $Al_2O_3$ | 0–18% |
| $Na_2O$ | 4–12% |
| $K_2O$ | 3.5–7% |
| CaO | 1–13% |
| MgO | 1–8%. |

11. The glass substrate of claim 1, wherein the surface ion exchange is by chemical tempering.

12. The glass substrate of claim 11 wherein said chemical tempering is performed in a $KNO_3$ bath at a temperature between 400°–520° C. for less than 24 hours.

13. The glass substrate of claim 11, wherein said chemical tempering further comprises electric field activation or ultrasonic activation.

14. The glass substrate of claim 1, having a surface roughness corresponding to a Ra value below 30 Angstroms.

15. The glass substrate of claim 14, having a surface roughness corresponding to a Ra value below 10 Angstroms.

16. The glass substrate of claim 1 in the form of a disk.

17. The glass substrate of claim 1, wherein said forming step is carried out by a float glass process.

18. The glass substrate of claim 1, wherein said forming step is carried out by parison pressing.

19. In a hard magnetic disk having a substrate, the improvement comprising said disk having the glass substrate of claim 1.

* * * * *